United States Patent
Zhu et al.

(10) Patent No.: US 7,676,578 B1
(45) Date of Patent: Mar. 9, 2010

(54) RESOURCE ENTITLEMENT CONTROL SYSTEM CONTROLLING RESOURCE ENTITLEMENT BASED ON AUTOMATIC DETERMINATION OF A TARGET UTILIZATION AND CONTROLLER GAIN

(75) Inventors: Xiaoyun Zhu, Cupertino, CA (US); Zhikui Wang, Sunnyvale, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 626 days.

(21) Appl. No.: 11/492,307

(22) Filed: Jul. 25, 2006

(51) Int. Cl.
*G06F 15/173* (2006.01)
*G06F 15/16* (2006.01)
*G06F 11/00* (2006.01)

(52) U.S. Cl. .............. 709/226; 709/229; 370/232; 711/170

(58) Field of Classification Search .............. None
See application file for complete search history.

(56) References Cited

U.S. PATENT DOCUMENTS

| | | | |
|---|---|---|---|
| 6,928,053 B1 * | 8/2005 | Kadengal | 370/232 |
| 2005/0268063 A1 * | 12/2005 | Diao et al. | 711/170 |
| 2008/0022284 A1 * | 1/2008 | Cherkasova et al. | 718/104 |

OTHER PUBLICATIONS

Wang, Z. et al., "Utilization vs. SLO-Based Control for Dynamic Sizing of Resource Partitions", HPL-2005-126, Jan. 23, 2006.

Apache Software Foundation, http://www.apache.org/, downloaded Jul. 21, 2006.

HP-UX Workload Manager, http://h20338.www2.hp.com/hpux11i/cache/328328-0-0-225-121.html?jumpid=reg_R1002_USEN, downloade Jul. 21, 2006.

Sun Solaris Resource Manager, http://www.sun.com/software/resourcemgr/index.html, downloaded Jul. 21, 2006.

VMware, www.vmware.com, downloaded Jul. 21, 2006.

Xen Virtual Machin, http://www.xensource.com/xen/about.html, downloaded Jul. 21, 2006.

Bari, P. et al., "Enterprise Workloa Manager Overview", IBM, Mar. 2005.

Chandra, A. et al., "Dynamic Resource Allocation for Shared Data Centers Using Online Measurements", downloaded Jul. 21, 2006.

(Continued)

*Primary Examiner*—Wen-Tai Lin

(57) ABSTRACT

A control system for controlling resource entitlement for a resource compartment in a resource-on-demand system includes nested loops. An inner loop includes an adaptive feedback control system including an adaptive controller operable to automatically determining a gain for the control system. The gain varies depending on a demand of the resource compartment in a previous interval, and the adaptive controller is operable to determine a resource entitlement for the resource compartment for a current interval based on the gain and a target utilization for the current interval. An outer loop includes a feedback control system operable to automatically determine the target utilization for the current interval, wherein the target utilization varies based on at least one QoS metric measured for the previous interval and a QoS metric target.

20 Claims, 9 Drawing Sheets

OTHER PUBLICATIONS

Gandhi, N. et al., "MIMO Control of an Apache Web Server: Modeling and Controller Design", downloaded Jul. 21, 2006.

Henriksson, D. et al, "Improved Prediction for Web Server Delay Control", downloaded Jul. 21, 2006.

Karlsson, M. et al., "Triage: Performance Isolation and Differentiation for Storage Systems", downloaded Jul. 21, 2006.

Liu, X. et al., "Adaptive Entitlement Control of Resource Containers on Shared Servers", HPL—2004-178, Hewlett Packard Co, Oct. 14, 2004.

Lu, C. et al, "Feedback Utilization Control in Distributed Real-Time Systems with End-to-End Tasks", IEEE Transactions on Parallel and Distributed Systems, Jun. 2005.

Lu, Y. et al., "An Adaptive Control Framework for QoS Guarantees and its Application to Differentiated Caching Services", downloaded Jul. 21, 2006.

Mosberger, D. et al., "httperf-A Tool for Measuring Web Server Performance", downloaded Jul. 21, 2006.

Sha, L. et al., "Queueing Model Based Network Server Performance Control", Proc. of the 23rd IEEE Real-Time Systems Symposium, IEEE, 2002.

Zhu, X. et al., "Utility-Driven Workload Managment Using Nested Control Design", HPL-2005-193, Hewlett Packard, Mar. 29, 2005.

Zhu, X. et al., "Utility-Driven Workload Managment Using Nested Control Design", HPL-2005-193, Hewlett Packard, Jun. 14, 2006.

* cited by examiner

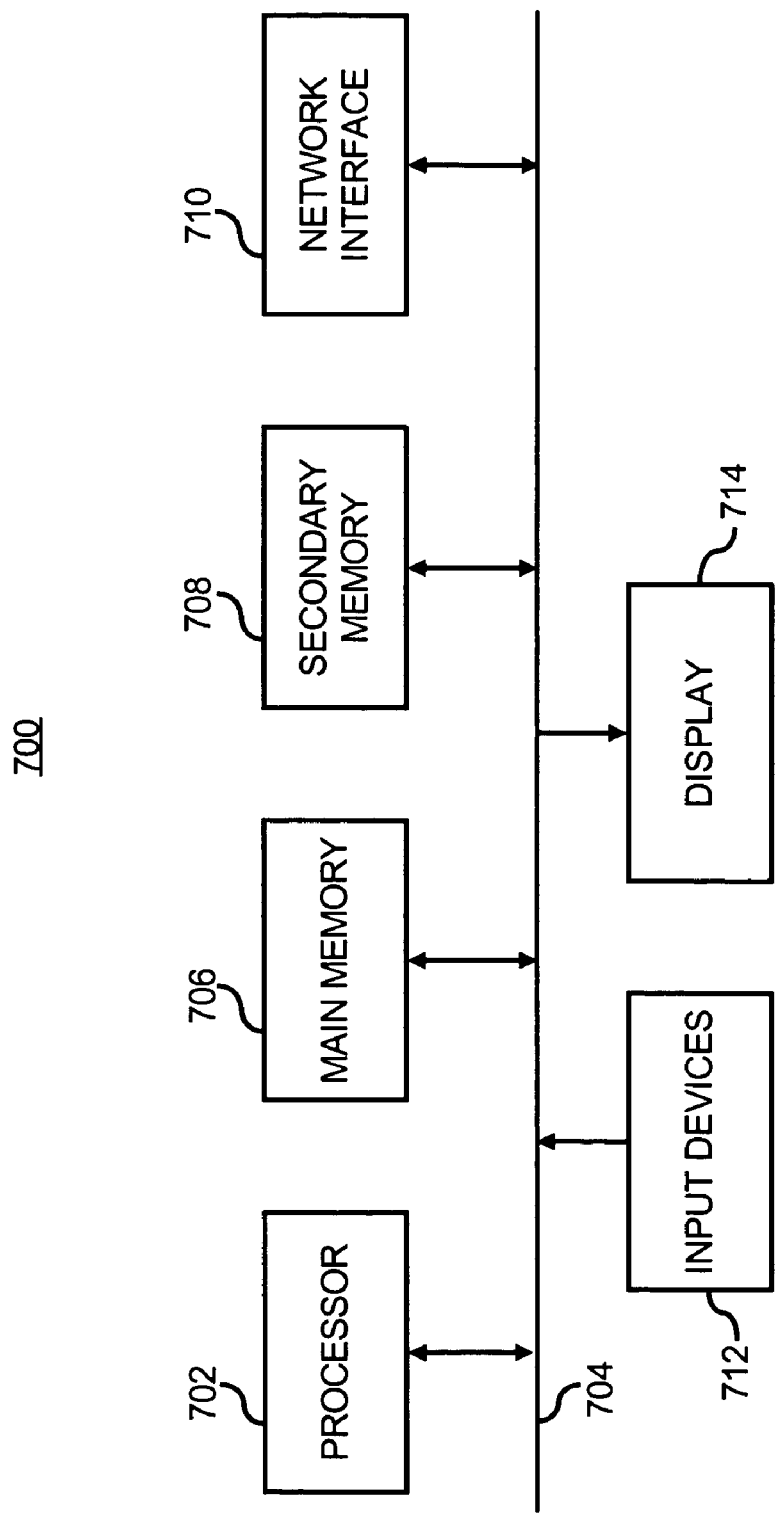

RESOURCE ENTITLEMENT CONTROL SYSTEM CONTROLLING RESOURCE ENTITLEMENT BASED ON AUTOMATIC DETERMINATION OF A TARGET UTILIZATION AND CONTROLLER GAIN

BACKGROUND

In many of today's data centers, servers are shared across multiple applications. However, current tools for allocating servers or server partitions to applications typically rely on offline capacity planning and performing a static partitioning of system resources to support these co-hosted applications. For example, each application is allocated a maximum entitlement of system resources for execution over the application's lifetime. Many times, the amount of the maximum entitlement of system resources is either based on anticipated peak load or demand profiles computed from historic data and performance models. However, the entitlement of system resources is static. For example, the entitlement of system resources is determined and used for a long period of time before being re-evaluated. This static entitlement typically results in poor utilization of system resources, which in many instances is below 20%, and does not take full advantage of demands that vary over time due to changes in operating conditions and user demands. In addition, this static entitlement cannot respond to unexpected spikes in demands therefore resulting in performance degradation or violation of service level objectives of the hosted applications.

BRIEF DESCRIPTION OF THE DRAWINGS

The utility, objects, features and advantages of the embodiments will be readily appreciated and understood from consideration of the following detailed description of the embodiments, when taken with the accompanying drawings, in which same numbered elements are identical and:

FIG. 7 is a block diagram of a computer system, according to an embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
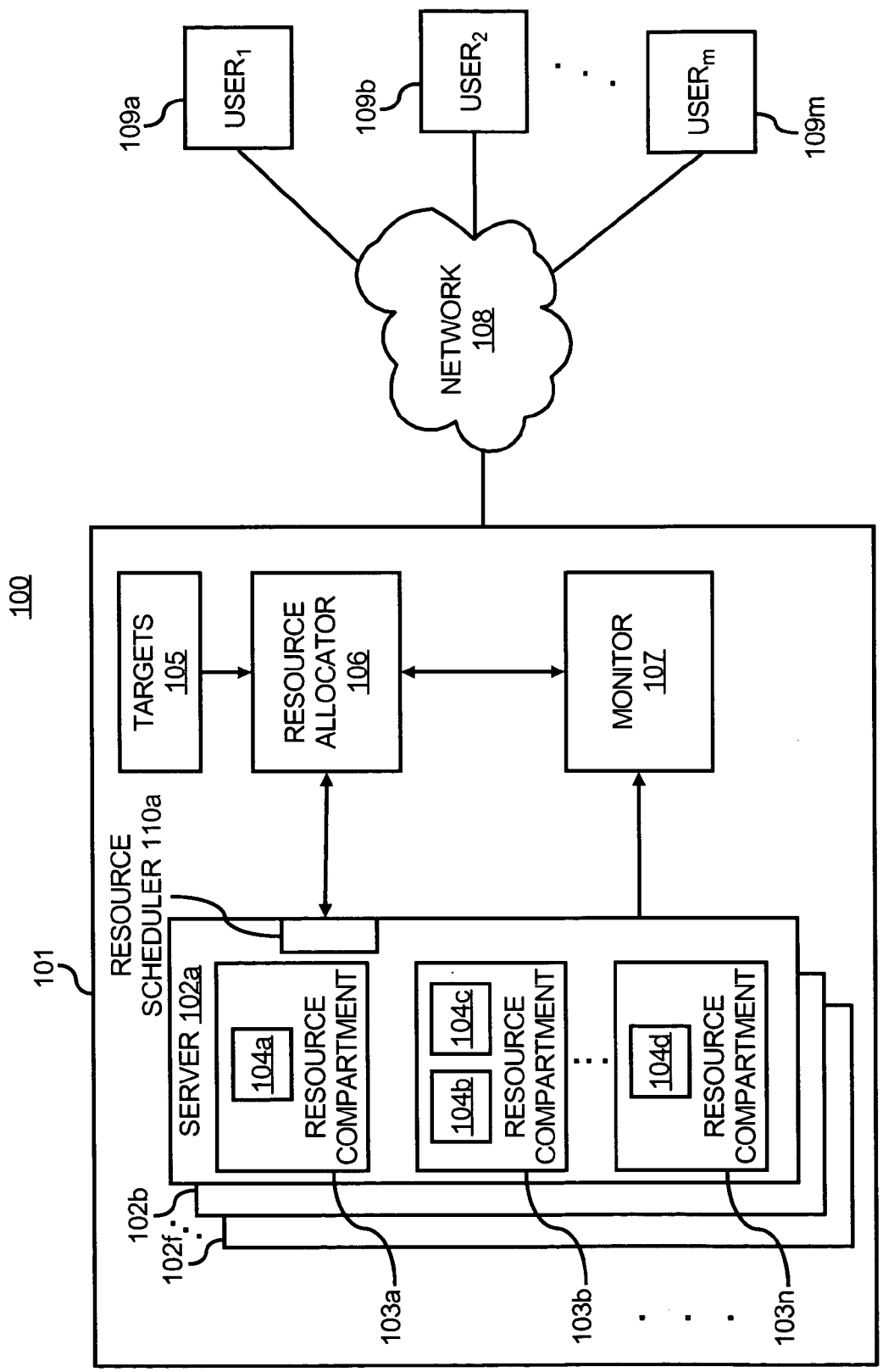
FIG. 1 is a block diagram of a system, according to an embodiment.

With reference first to FIG. 1, there is shown a system 100, according to an embodiment. The system 100 is operable to provide resources on demand. It will be apparent to one of ordinary skill in the art that one or more of the embodiments described herein may be practiced in different types of resource on demand environments, such as a data center where servers or portions of servers are allocated, a grid environment, and other types of resource-on-demand environments.

As shown, the system 100 includes a data center 101 connected to a network 108. One or more client devices 109a . . . m, such as a Personal Computer (PC), Personal Digital Assistant (PDA), wireless terminal, cellular telephone, or another type of well known client device is connected to the data center 101 via the network 108. The client device may also include servers which may be in different data centers. The network 108 may be a private network such as an intranet, and/or a public network such as, for example, the Internet.

The data center 101 includes servers 102a . . . f that may be allocated to applications, a resource allocator 106, a monitor 107, and targets 105. According to an embodiment, the resources for the data center 101 may be partitioned and assigned to applications. Resources may include CPUs, storage space, network bandwidth, disk I/O bandwidth, etc. Resource partitioning is a type of virtualization technology that enables multiple applications to share resources while maintaining performance isolation and differentiation among them. For example, CPUs or portions of a CPU, such as in terms of CPU cycles, may be allocated to different applications or different groups of applications. Partition sizes may be set to accommodate the parameters specified in the targets 105 and varying demands, as described in further detail below.

In one embodiment, the resources of the data center 101 are partitioned into resource compartments. The resource compartments 103a . . . n are shown as an example of partitioning the resources of the server 102a. Each resource compartment 103a . . . n includes resources allocated for one or more applications.

In one embodiment, a resource compartment is represented as a process group including one or more applications. The resource compartment 103a, for example, is a process group including application 104a. A process group may include multiple applications such as shown for the resource compartment 103b. In this embodiment, the resources of the server 102a are partitioned for each process group. For example, the CPUs in the server 102a are divided among the resource compartments 103a . . . n. Other resources may be partitioned and assigned to each process group, such as memory, disk space, network bandwidth, etc. A limit on system resources may be assigned to each group which may specify the maximum entitlement of a particular resource to a particular group. A minimum entitlement may also be specified.

Different types of process groups may be used. For example, a processor set (PSET) group may be used. For example, a PSET group is allocated an integer number of CPUs. Another type of process group is a fair share scheduler (FSS) group, where a percentage of CPU cycles are allocated to a group by specifying a number of shares for the group.

In another embodiment, the servers 102a . . . f are partitioned into virtual machines. For example, each resource compartment includes a virtual machine wherein a set of resources are allocated to each virtual machine. Virtual machines provide a technology to implement resource virtualization that allows multiple heterogeneous operating system instances to share a single physical workstation or server.

Like a process group, each virtual machine receives an allocation of resources, such as a percentage of CPU capacity, storage capacity, network bandwidth, etc.

In yet another embodiment, a resource compartment may include a server group. For example, the servers 102a . . . f may include a plurality of server groups that are allocated to one or more applications.

Each of the servers 102a . . . f may include a resource scheduler that allocates resources among the resource compartments based on instructions from the resource allocator 106. In one embodiment, a resource scheduler is the fair share scheduler (FSS) in Hewlett-Packard's HP-UX Process Resource Manager (PRM). The PRM is a resource management tool that controls how resources are partitioned and allocated to the resource compartments.

A resource scheduler 110a is shown for the server 102a. Although not shown, one or more resource schedulers may be provided for each server or a single resource scheduler may be used for multiple servers.

The targets 105 include one or more utilization parameters that specify a level of resource utilization to be met by a particular compartment. In one embodiment, the targets 105 include target utilizations, which are target resource utilizations, provided by a user, such as a data center operator, based on past experience. In another embodiment described in further detail below with respect to FIG. 3A, a controller determines the target utilization based on at least one metric, such as one or more application quality of service (QoS) metrics that may be related to service level objectives (SLOs) for the hosted applications. Examples of QoS metrics include but are not limited to response time and throughput. Throughput may include the number of sessions or requests that are completed per second. A higher throughput means there is less loss, such as a smaller number of sessions or requests that are not processed. In this embodiment, the targets 105 may include targets for one or more application QoS metrics that are used by the controller to determine the target utilization, and the target utilization is then used to determine the resource entitlement for a resource compartment.

The monitor 107 provides monitoring information to the resource allocator 106. For example, the monitor 107 measures utilization metrics for each resource compartment 103a . . . n and provides the measured metrics to the resource allocator 106. The measured utilization metrics may include measurements for determining how much of a resource was actually used by a resource compartment, such as the consumption of entitled CPUs, storage, and bandwidth. The metrics may be used to determine utilization, such as CPU utilization, storage utilization, bandwidth utilization, etc, which are compared to the corresponding target utilizations.

The monitoring information may also include measured QoS metrics for the applications running in the resource compartments 103a . . . n. For example, QoS metrics may include response time, throughput, etc. The measured QoS metrics may be sent to the resource allocator 106. The monitor 107 determines monitoring information for one server or multiple servers, or multiple monitors may be used to determine monitoring information for multiple servers.

The resource allocator 106 determines the allocation of resources for a resource compartment. For example, the resource allocator 106 allocates the resources of the server 102a to each resource compartment 103a . . . n based on one or more of the utilization metrics measured by the monitor 107, QoS metrics measured by the monitor 107, and targets from the targets 105, such as target utilizations or targets for the QoS metrics as described in further detail below. FIG. 1 shows one resource allocator and one monitor by way of example. It will be apparent to one of ordinary skill in the art that more than one resource allocator and monitor may be used.

According to an embodiment, the resource allocator 106 controls the resource entitlement for a resource compartment for each interval to achieve a target utilization. The intervals are also referred to as sampling intervals. Resource entitlement is the amount of a resource allocated to a resource compartment. For example, 0.5 CPUs are allocated to the resource compartment 103a. In this example, 0.5 CPUs is the resource entitlement for the resource compartment 103a for the CPU resource. Resource entitlement may also be determined for other resources. Resource consumption is the amount of the resource that is used by the resource compartment for a given interval. In the above example, if the resource compartment 103a is allocated 0.5 CPUs, which is the resource entitlement in this example, and only 0.3 CPUs are actually used, then 0.3 CPUs is the resource consumption for the resource compartment 103a for the CPU resource. Resource utilization is the ratio of the resource consumption to the resource entitlement for a resource in a resource compartment for an interval. In the above example, the resource utilization for the resource compartment 103a for the CPU resource is 0.3/0.5=0.6.

Figure 3A:
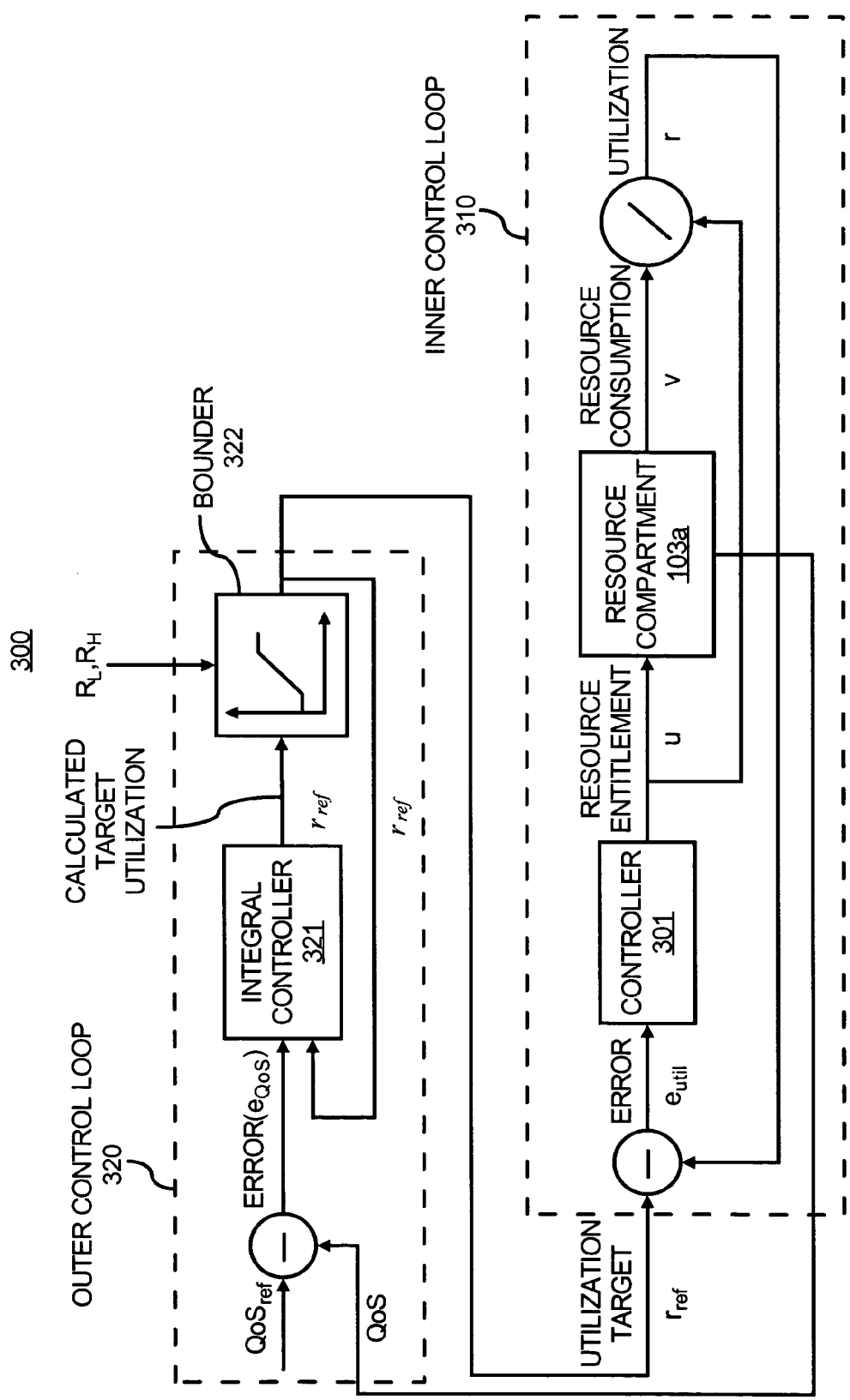
FIGS. 3A-C are block diagrams of control systems including nested loops for controlling resource entitlement, according to embodiments.

According to an embodiment, the resource allocator 106 includes nested control loops to control resource entitlement as shown in FIG. 3A described below. For example, a first control loop is used to determine a target utilization based on a measured QoS metric and a target for the QoS metric. Also, an adaptive feedback control loop is used to adjust the resource entitlement to achieve the target utilization based on a difference between the target utilization and a measured utilization and based on the time-varying demand of applications in the resource compartments.

Figure 2:
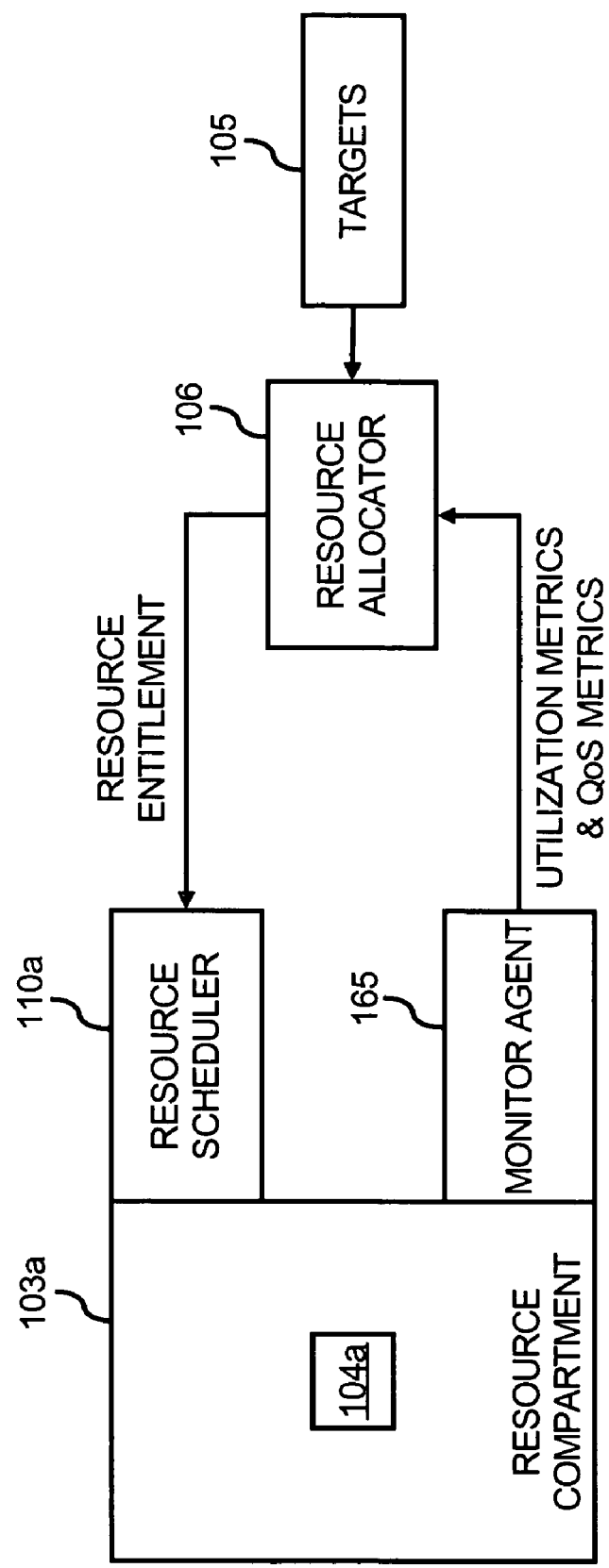
FIG. 2 is a detailed functional block diagram of the system, according to an embodiment.

With respect to FIG. 2, there is shown a more detailed block diagram of a system including the resource allocator 106 controlling resource entitlement for a resource compartment, such as the resource compartment 103a including application 104a. Although not shown, it will be apparent to one of ordinary skill in the art that the resource allocator 106 may control the resource entitlement for a plurality of resource compartments and various types of partitions, including virtual machines.

The resource scheduler 110a and a monitor agent 165 may be respectively used to allocate resources for the resource compartment 103a and to determine the monitoring information for the resource compartment 103a. The monitor agent 165, for example, is part of the monitor 107 shown in FIG. 1 that may include sensors, not shown, for measuring the utilization metrics and QoS metrics. For example, the monitor agent 165 sends the monitoring information, including the measured utilization metrics and QoS metrics, to the resource allocator 106. The measured metrics may be used as feedback on resource demand, utilization, and QoS for the resource compartment 103a. The monitor agent 165 may determine a statistical metric for each measured metric, such as an average or a moving average. The statistical metric may also be considered a utilization metric or QoS metric. For example, CPU utilization is determined for a time interval. Multiple measurements are performed during the time interval, and a single value, such as average, moving average, etc., is generated as a representation of CPU utilization for the time interval. Similarly, instead of an actual measured response time, a mean response time or a percentile of a response time may be used to represent response time for an interval.

The resource allocator 106 may interact with the resource compartment 103a through the resource scheduler 110a and the monitor agent 165. The monitor agent 165 periodically sends or is polled by the resource allocator 106 to send the measured metrics for the application 104a, and the resource scheduler 110a sets the resource entitlement according to the output of the resource allocator 106. For example, at the beginning of each time interval, the resource allocator 106 receives the measured metrics for the last time interval, and calculates the needed entitlement for the current time interval using control algorithms described in detail below and passes the entitlement to the resource scheduler for actuation.

FIG. 3A illustrates a control system 300 for controlling resource entitlement for a resource compartment, according to an embodiment. The control system 300 may be provided in the resource allocator 106 shown in FIGS. 1 and 2.

In the control system 300, such as shown for the inner control loop 310, u denotes resource entitlement, v denotes resource consumption, r denotes resource utilization where $r=v/u$, $r_{ref}$ is the target utilization, and $e_{util}$ is the error between $r_{ref}$ and r. A function of a controller 301 for the inner control loop 310 is to dynamically maintain the utilization r at the target utilization $r_{ref}$. For example, sensors measure the resource utilization over consecutive time intervals and the monitor agent 165 shown in FIG. 2 sends the measurements to the controller 301. The length of the intervals may be predetermined. At each interval, the controller 301 adjusts the resource entitlement of the resource compartment 103a based on the resource utilization of the resource compartment for one or more previous intervals in attempt to maintain the utilization r at the target utilization $r_{ref}$. However, the consumption v of the resource may change for each interval, because the demand of the resource compartment 103a may vary over each interval. Thus, the resource entitlement u may be adjusted at each interval to achieve the target utilization $r_{ref}$.

The controller 301 may be used to control a single-input-single-output (SISO) system that represents the resource compartment 103a. The input is the resource entitlement u and the output is the resource utilization r. Let k denote the kth interval. From testing, for a workload with a resource demand V, a nonlinear static model was derived to represent the input-output relation for the resource compartment 103a as follows:

$$r(k)=1 \text{ if } u(k)<V; \text{ and} \quad \text{Equation (1)}$$

$$r(k)=v(k)/u(k), \text{ if } u(k)>=V. \quad \text{Equation (2)}$$

Equations (1) and (2) illustrate the bimodal behavior of a system being controlled by the controller 301. Generally, equation (1) indicates that when an overload condition occurs for the interval k, such as when the demand V of the resource compartment 103a requires a larger amount of the resource than entitled to the resource compartment 103a for the interval k, the utilization r(k) is 1. During an overload condition, the demand V may exceed the consumption v because the resource entitlement was insufficient. In an underload condition, such as when the demand V requires less than the amount of resources entitled to the resource compartment 103a for the interval k, the utilization r(k) is the resource consumption v(k) divided by the resource entitlement u(k).

The error $e_{util}$ at the interval k between the measured utilization r(k) and the target utilization $r_{ref}$ is defined as follows:

$$e_{util}(k)=r_{ref}-r(k). \quad \text{Equation (3)}$$

According to an embodiment, the inner control loop 310 is an adaptive feedback control system and the controller 301 may be an adaptive integral controller. As is known in the art, an integral controller for a feedback control system ensures zero steady state error with appropriate value of a gain $K_i$. The gain $K_i$ of the integral controller determines the aggressiveness of the adjustment of the entitlement made for each interval for the measured utilization r to achieve the target utilization $r_{ref}$. However, typically the gain $K_i$ is set to a default value which can cause the controller to become unstable due to the bimodal nature of the system and the time-varying demand of the applications. According to an embodiment, the gain $K_i$ is calculated for each interval by the controller 301. In particular the controller 301 as an adaptive controller calculates the resource entitlement as follows:

$$u(k)=u(k-1)-K_{I1}(k)e_{util}(k-1). \quad \text{Equation (4)}$$

The time-varying adaptive gain $K_{I1}$ is calculated for each interval k as follows:

$$K_{I1}=\lambda_1 u(k-1)/r_{ref}, \text{ when } u(k-1)=v(k-1); \text{ and} \quad \text{Equation (5)}$$

$$K_{I1}=\lambda_2 v(k-1)/r_{ref}, \text{ when } u(k-1)>v(k-1). \quad \text{Equation (6)}$$

The intuition behind this adaptive gain determination is from the bimodal property of the utilization with respect to resource consumption. For example, when allocating CPU resources for a resource compartment, when an overload condition occurs, the CPU consumption is capped by the CPU entitlement. The control system 300 needs to react fast to accommodate the increase in workload. When an underload condition occurs, the control system 300 may be conservative in reducing the resource entitlement to avoid going into the overload region again, which may result in unavailability and large response times. The controller 301 using equations (4)-(6) is operable to produce the above desirable behavior by using different gains in underload and overload conditions. $\lambda_1$ and $\lambda_2$ are both positive real numbers that may operate as weighting factors for controlling the adaptive gain under the different conditions. Through testing, it has been observed that the controller 301 is scalable and adaptive to the workload, and shows good convergence performance when $\lambda_2$ is in the range of 0-2 inclusive.

Through testing, it has been determined that the adaptive controller 301 in the inner loop 310 works well to aggressively entitle more resources, such as increasing CPU entitlement, when the system is overloaded and to slowly decrease CPU entitlement when the system is underloaded. However, the adaptive controller 301 does not take into consideration QoS metrics and QoS metric targets when determining resource entitlement. In many instances, applications, such as applications in the resource compartments shown in FIG. 1, have specified QoS metric targets that should be met by a resource-on-demand system, such as the data center 101 shown in FIG. 1 hosting the applications in the resource compartments. For example, a QoS metric target may include a desired response time for an application or a desired throughput for an application. The QoS metric targets may be specified in SLOs, which may be included in a service level agreement.

Through testing it has been shown that a bimodal behavior exists in the mapping of CPU entitlement to a QoS metric of mean response time (MRT). That is, when the system is overloaded, a linear mapping exists from CPU entitlement to 1/MRT. Thus, when the system is overloaded, generally if CPU entitlement is increased, the MRT is decreased in an inversely-proportional relationship. However, when the system is underloaded, the MRT quickly drops off and becomes uncorrelated to the CPU entitlement. Both the CPU entitlement and the resulting MRT may became unstable because of over-tuning actions of the adaptive controller 301 when the system is underloaded, and thus the adaptive controller 301 only improves the performance very marginally. Also, the system may switch between being underloaded and overloaded depending on the demand of the applications.

As described above, the inner control loop 310 uses the utilization target $r_{ref}$ to adjust resource entitlement u such that the resource utilization r approaches the utilization target $r_{ref}$. According to an embodiment, the outer control loop 320 is operable to adjust $r_{ref}$ to maximize resource utilization and to achieve a QoS metric target, such as a target for MRT, even when the system is underloaded. Also, upper and lower bounds for the utilization target $r_{ref}$ may be used to minimize over tuning of the adaptive controller 301 and thus minimize oscillations between placing the system in the underloaded and overloaded states.

As described above, the relationship between a QoS metric and the utilization target $r_{ref}$ varies based on the demand of the applications on the resource. For example, an $r_{ref}$=50% may be needed for bursty and highly interactive applications while an $r_{ref}$=80% may be sufficient for predictable application demands. A controller 321 of the outer control loop 320 is operable to adjust $r_{ref}$ so a QoS metric target is achieved and utilization is maximized. For example, if the QoS metric is MRT, the controller 321 reduces $r_{ref}$ if the MRT is high, so that CPU entitlement is increased and ultimately MRT is reduced. If the MRT is low, the controller 321 increases $r_{ref}$ so that the CPU entitlement is decreased and ultimately utilization is maximized. Upper and lower bounds $R_L$ and $R_H$ for $r_{ref}$ may be used to control the MRT and utilization. For example, the controller 321 sets $r_{ref}$ to $R_L$ if the calculated $r_{ref}$ is less than or equal to $R_L$ and sets $r_{ref}$ to $R_H$ if the calculated $r_{ref}$ is greater than or equal to $R_L$. This is illustrated by the bounder 322 which may be incorporated in the functions of the controller 321 and the bounding performed by the bounder 322 may actually be performed by the controller 321.

The controller 321 may be an integral controller and equation (7) may be used to calculate $r_{ref}$ as follows:

$$\tilde{r}_{ref}(j)=r_{ref}(j-1)+K_{I2}(QoS_{ref}-QoS(j-1)) \qquad \text{Equation (7)}$$

In equation (7), $\tilde{r}_{ref}(j)$ is the calculated $r_{ref}$ for the current interval j. $K_{I2}$ is the gain of the integral controller 321 and $QoS_{ref}-QoS(j-1)$ is the error between the measured QoS metric and the QoS metric target $QoS_{ref}$. $QoS_{ref}$ may be predetermined. $r_{ref}(j-1)$ is the $r_{ref}$ determined for the previous interval j−1. Depending on the relation between the QoS metric and the utilization, the sign of the gain $K_{I2}$ may be positive or negative. For example, if the QoS metric is MRT, it is positive; if the QoS metric is throughput, it is negative.

It should be noted that the sampling interval for the inner control loop 310 may be different than the sampling interval for the outer control loop 320. Generally, the inner control loop 310 may use a shorter sampling interval than the outer control loop 320. However, the duration of the sampling intervals may be set dependent on the dynamics of each control loop.

As described above, if the calculated $\tilde{r}_{ref}(j)$ exceeds the upper bound $R_H$ or is below the lower bound $R_L$, then $r_{ref}(j)$ is set to $R_L$ or $R_H$, respectively, as shown by equation (8) below. If the calculated $\tilde{r}_{ref}(j)$ is between $R_L$ and $R_H$, then $r_{ref}(j)$ is set to the calculated $\tilde{r}_{ref}(j)$, also as shown by Equation (8) as follows:

$$r_{ref}(j)=\min(R_H,\max(R_L,\tilde{r}_{ref}(j))) \qquad \text{Equation (8)}$$

The upper bound $R_H$ and the lower bound $R_L$ may be used to minimize over tuning of the adaptive controller and also to maximize utilization while maintaining one or more QoS metrics within satisfactory limits. For example, through testing on a particular platform for a particular resource compartment it was shown that MRT may be maintained within a predetermined SLO of less than or equal to 2 seconds while the CPU is 100% utilized. However, at 100% utilization the throughput may be 50% or less, resulting in many requests being dropped. It was also shown that if CPU utilization was at 95%, the MRT target is met and throughput can be maintained at an acceptable level. Thus, the upper and lower bounds $R_H$ and $R_L$ may be used to achieve targets for multiple QoS metrics.

Figure 3B:
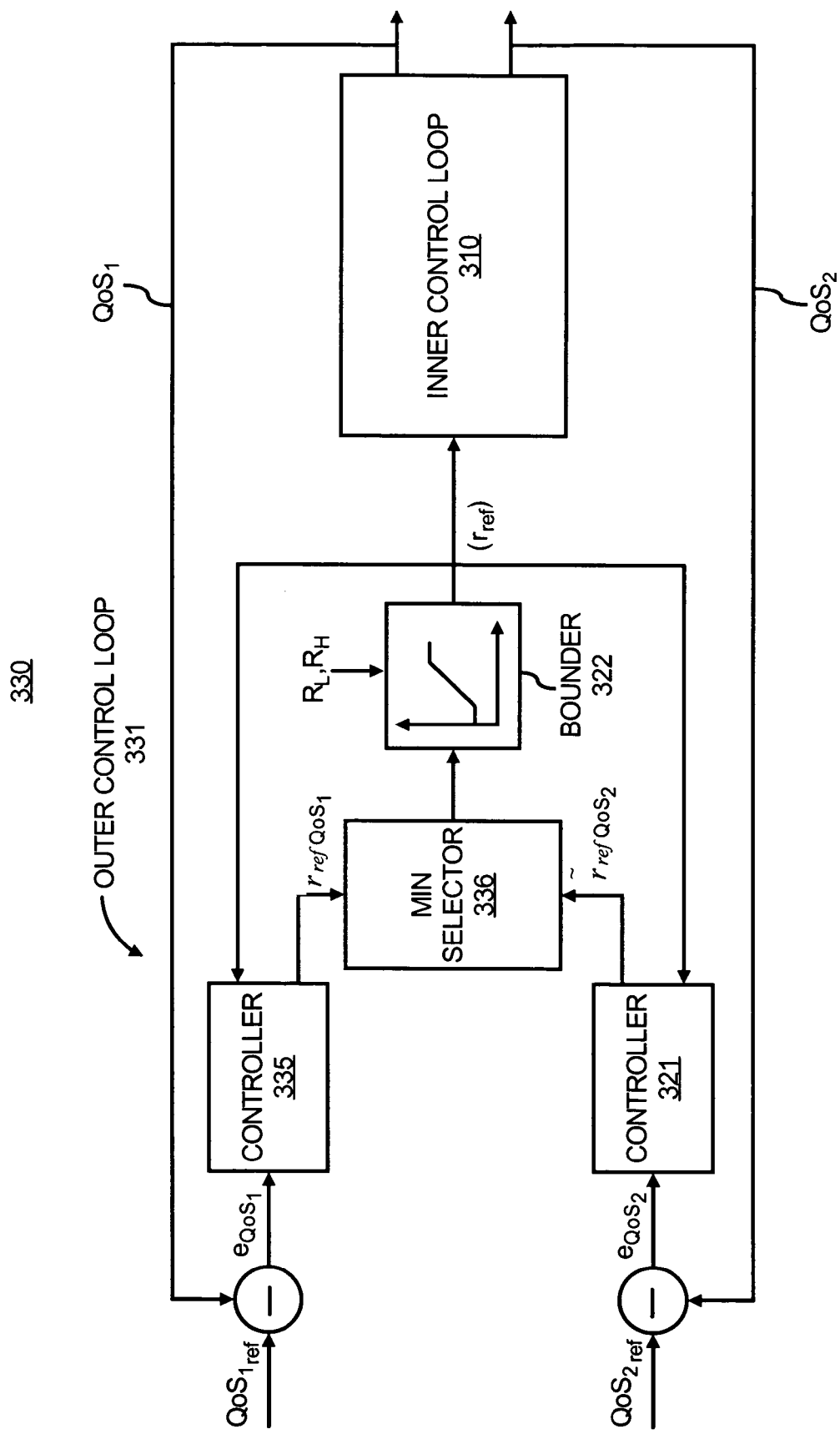

FIG. 3B illustrates a control system 330 for controlling resource entitlement for a resource compartment, according to an embodiment. The control system 330 is similar to the control system 300 shown in FIG. 3A. Both control systems include nested loops. However, the outer control loop 331 of the control system 330 includes an additional controller 335. The controller 335 uses Equation (7) to calculate a reference utilization for a first QoS metric, $QoS_1$, and the controller 321 uses Equations (7) to calculate a reference utilization for a second QoS metric, $QoS_2$. For example, $QoS_1$ may include throughput and $QoS_2$ may include MRT.

The outer control loop 331 also includes a min selector 336 which selects the minimum of the outputs of the controllers 335 and 321. For example, if the calculated $\tilde{r}_{ref}(j)$ for $QoS_1$ is less than the calculated $\tilde{r}_{ref}(j)$ for $QoS_2$, then $\tilde{r}_{ref}(j)$ for $QoS_1$ is selected by the min selector 336. Otherwise, $\tilde{r}_{ref}(j)$ for $QoS_2$ is selected by the min selector 336. The calculated target utilization selected by the min selector 336 is compared to the upper and lower bounds $R_H$ and $R_L$ at the bounder 322. If the selected calculated target utilization exceeds the upper bound $R_H$ or is below the lower bound $R_L$, then $r_{ref}(j)$ is set to $R_H$ or $R_L$, respectively. If the selected calculated target utilization is between $R_L$ and $R_H$, then $r_{ref}(j)$ is set to the selected calculated $r_{ref}(j)$. The min selector 336 and the bounder 322 may be used to minimize oscillations for the adaptive controller 301 in the inner control loop 310 and may be used to satisfy the QoS metric targets while maximizing resource utilization.

Figure 3C:
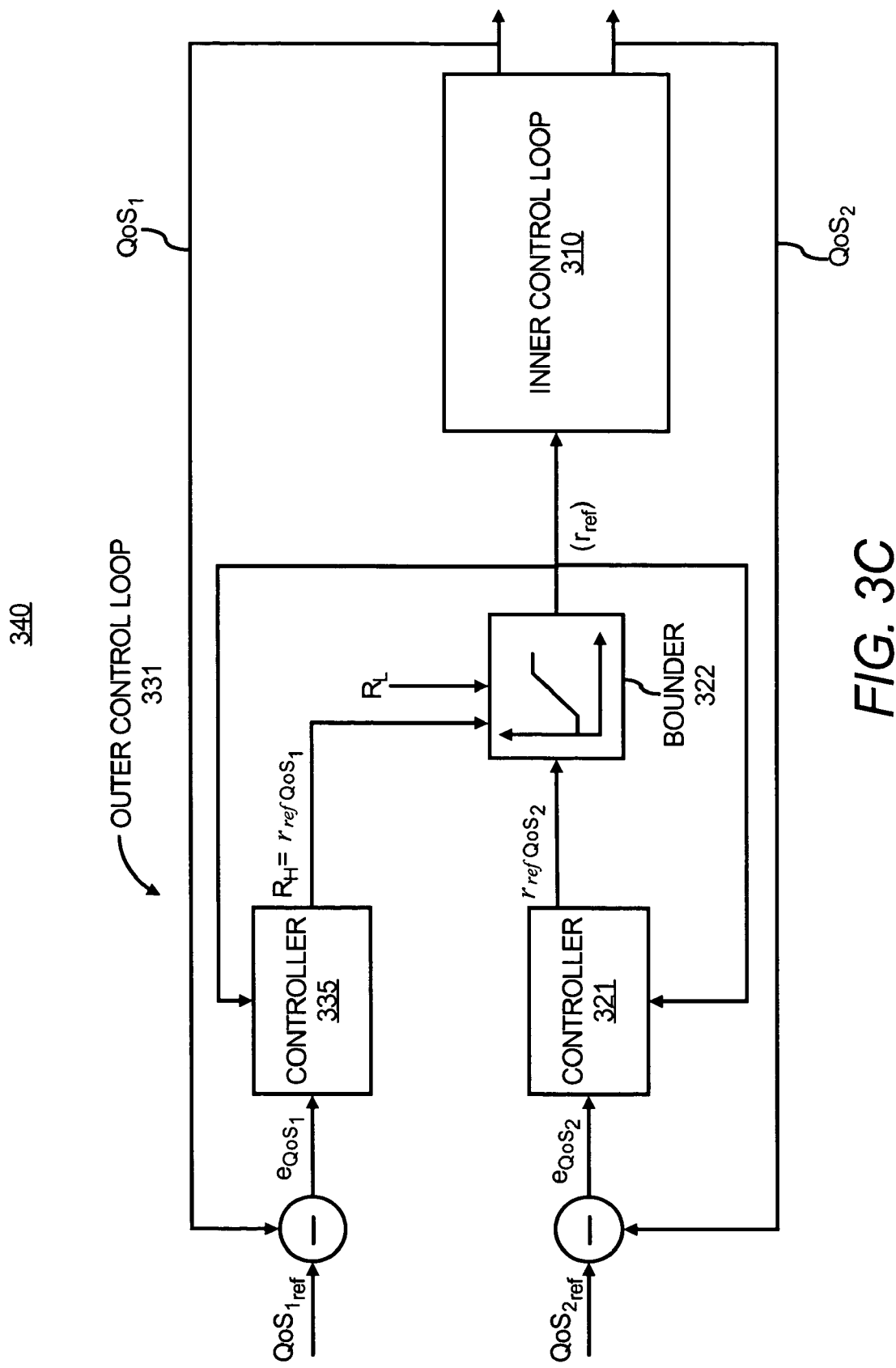

FIG. 3C illustrates a control system 340 for controlling resource entitlement for a resource compartment, according to an embodiment. The control system 340 is similar to the control system 330 shown in FIG. 3B. Both control systems include nested loops and both outer control loops include two controllers. However, in the control system 340, the controller 335 calculates a target utilization to be used as the upper bound $R_H$ to be used by the bounder 322. Equation (7) may be used to calculate the target utilization to be used as the upper bound $R_H$.

The controllers for the systems shown in FIGS. 3A-C may include integral controllers, proportional-integral (PI) controllers, proportional-integral-derivative (PID) controllers or other types of known controllers in control systems for calculating target utilizations and resource entitlement.

Figure 4:
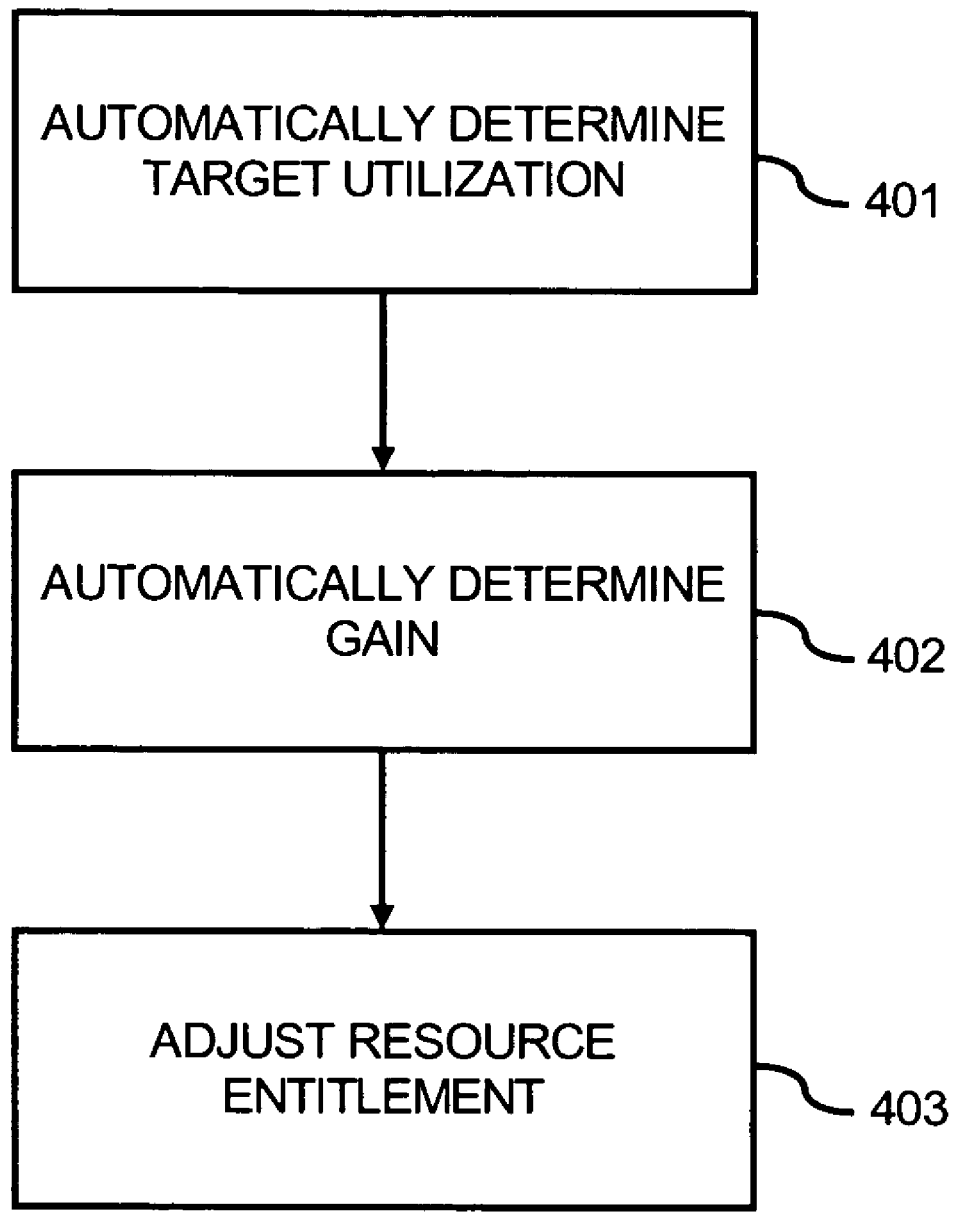
FIG. 4 is a flowchart of a method for controlling resource entitlement for a resource compartment, according to an embodiment.

FIG. 4 illustrates a method 400 for controlling resource entitlement for a resource compartment, according to an embodiment. The method 400 is described with respect to FIGS. 1-3 by way of example and not limitation.

At step 401, the resource allocator 106, shown in FIGS. 1-2 automatically determines a target utilization for a resource compartment for a current interval, wherein the target utilization varies based on a QoS metric measured for a previous interval. For example, the controller 321 in the outer control loop 320 shown in FIG. 3A determines the target utilization $r_{ref}$ using Equations (7)-(8) described above.

At step 402, the resource allocator 106 automatically determines a gain for a control system controlling the resource entitlement for the resource compartment, wherein the gain varies depending on a demand of the resource compartment in the previous interval and the determined target utilization. For example, the controller 301 in the inner control loop 310 shown in FIG. 3A using equations (5)-(6) is operable to calculate the gain.

At step 403, the resource allocator 106 adjusts a resource entitlement for the resource compartment for the current interval based on the gain and the target utilization. For example, the controller 301, using equations (4)-(6), calculates the resource entitlement for the current interval.

Figure 5:
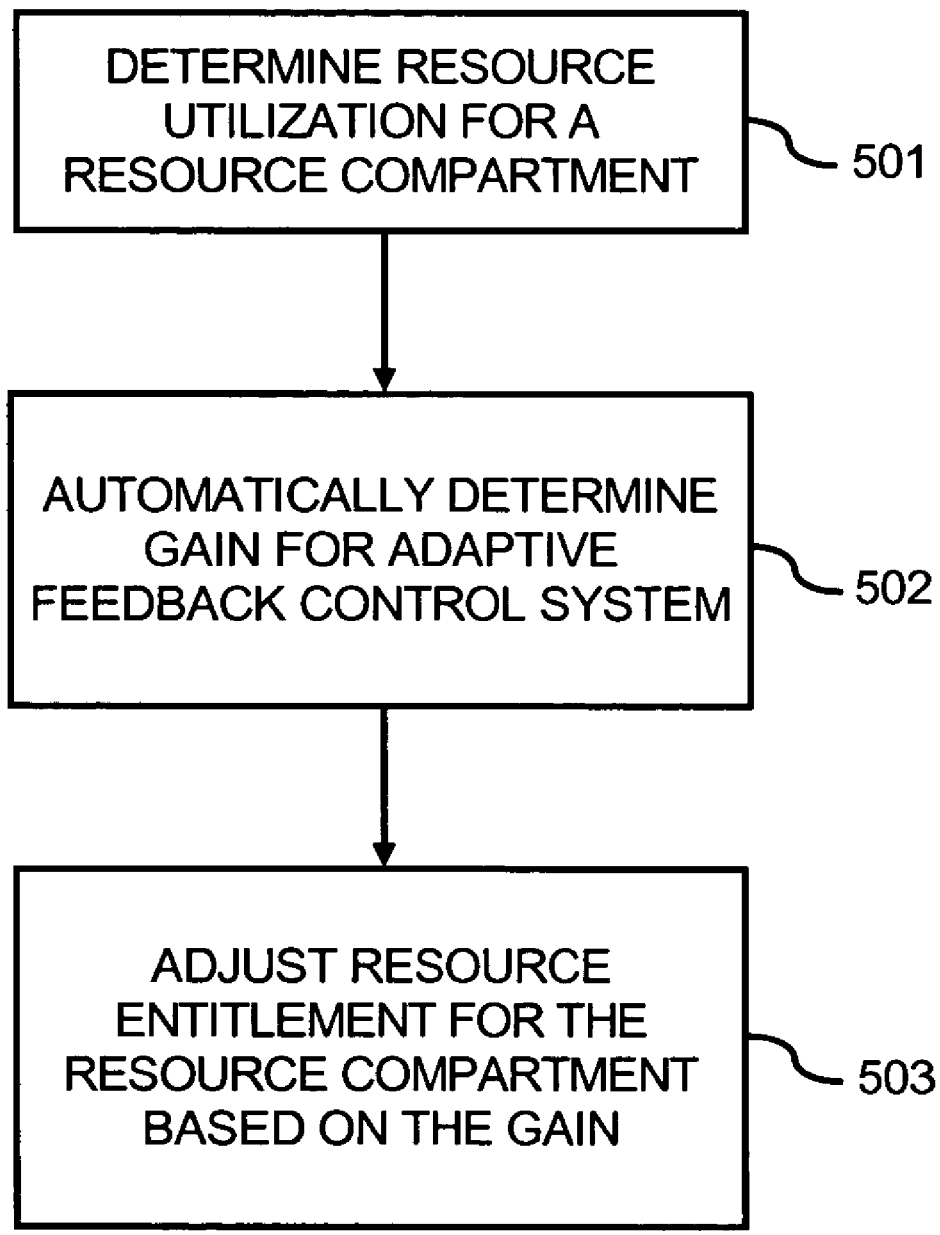
FIG. 5 is a flowchart of a method for adjusting resource entitlement in an adaptive feedback control system, according to an embodiment.

FIG. 5 illustrates a method 500, according to an embodiment, for adjusting resource entitlement based on changes in demand over time using an adaptive feedback control loop, such as provided in the inner control loop 310 shown in FIG. 3A. The steps of the method 500 may be performed at steps 402 and 403 for the method 400, and the steps of the method 500 are described with respect to FIGS. 1-3 by way of example and not limitation.

At step 501, the controller 301 shown in FIG. 3A determines a resource utilization for a resource compartment. The resource utilization for a resource compartment may be the resource utilization of the application(s) in the resource compartment for a process group or the resource utilization of the VM if the resource compartment is a VM. Resource utilization may be determined from measurements taken by the monitor 107 shown in FIG. 1 and sent to the controller 301 from the monitor agent 165 shown in FIG. 2. The resource utilization may be determined for a previous interval (k−1) in order to calculate the resource entitlement for the current interval (k).

At step 502, the controller 301 automatically determines a gain for the inner control loop 310, which varies depending on a demand of the resource compartment in the previous interval. For example, the controller 301 determines the adaptive gain $K_{I1}$ for adjusting the resource entitlement u(k), which varies based on the demand of the applications in the resource compartment for the interval (k−1). Equations (5)-(6) may be used to calculate the gain.

At step 503, the controller 301 adjusts a resource entitlement for the resource compartment for a current interval based on the gain. For example, the resource entitlement u(k) is calculated using the gain $K_{I1}$ as described in equation (4). The controller 301 may instruct the resource scheduler 110 shown in FIG. 2 to adjust resource entitlement accordingly for the interval (k).

Figure 6:
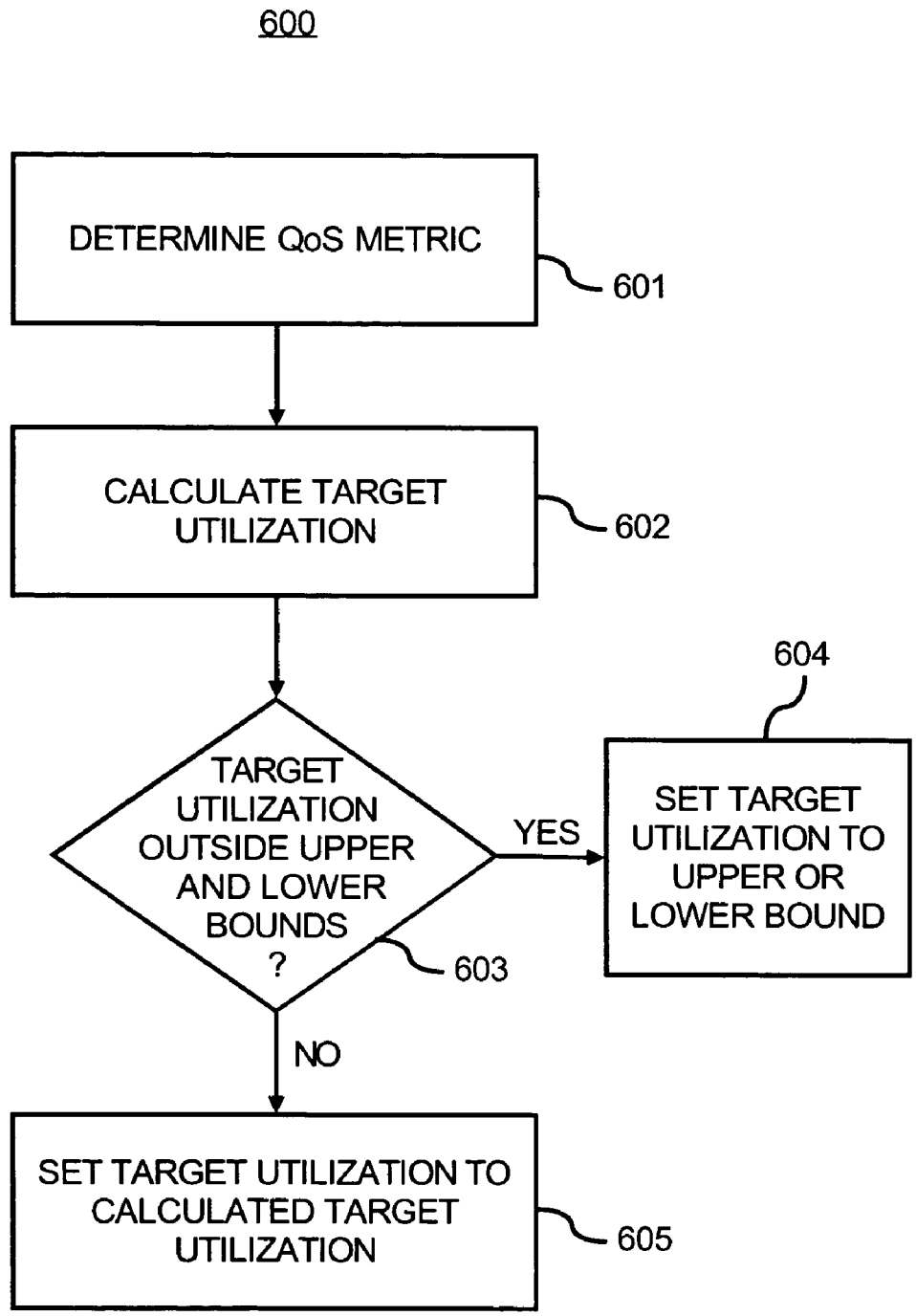
FIG. 6 is a flowchart of a method for determining a target utilization, according to an embodiment.

FIG. 6 illustrates a method 600, according to an embodiment, for determining a target utilization, such as determined by the outer control loop 320 shown in FIG. 3A. The steps of the method 600 may be performed at step 401 for the method 400, and the steps of the method 600 are described with respect to FIGS. 1-3 by way of example and not limitation.

At step 601, the controller 321 shown in FIG. 3A determines a measured QoS metric for a resource compartment. The QoS metric for the resource compartment may be a measured QoS metric of the applications in the resource compartment for a process group or a measured QoS metric of the VM if the resource compartment is a VM. The measured QoS metric may be determined from measurements taken by the monitor 107 shown in FIG. 1 and sent to the controller 321 from the monitor agent 165 shown in FIG. 2. The measured QoS metric may be determined for a previous interval (k−1) in order to calculate the target utilization to be used for determining the resource entitlement for a current interval (k).

At step 602, the controller 321 calculates the target utilization based on Equation (7).

At step 603, the controller 321 compares the calculated target utilization to upper and lower bounds $R_L$ and $R_H$. If the calculated target utilization is outside the upper and lower bounds, the target utilization is set to the upper or lower bound at step 604. Otherwise, the target utilization is set to the calculated target utilization at step 605. The target utilization may then be used to determine the resource entitlement as described above.

The steps of the methods 400-600 may be performed for each sampling interval of a plurality of sampling intervals. Thus, the resource entitlement for a resource compartment may be periodically adjusted to achieve the target utilization $r_{ref}$. Furthermore, the steps of the methods 400-600 may be performed for several resource compartments in order to provide the most efficient allocation of resources across one or more resource compartments or servers servicing multiple applications with varying demands and to achieve a QoS metric target.

FIG. 7 illustrates an example of a hardware platform for the resource allocator 106 and other components shown in FIGS. 1-3. For example, the hardware platform includes a computer system 700. The computer system 700 includes one or more processors, such as processor 702, providing an execution platform for executing software. Commands and data from the processor 702 are communicated over a communication bus 704. The computer system 700 also includes a main memory 706, such as a Random Access Memory (RAM), where software may be resident during runtime, and a secondary memory 708. The secondary memory 708 includes, for example, a hard disk drive or other type of storage device. Other examples of the secondary memory 708 include ROM (read only memory), EPROM (erasable, programmable ROM), EEPROM (electrically erasable, programmable ROM).

The computer system 700 optionally includes user interfaces comprising one or more input devices 712, such as a keyboard, a mouse, a stylus, and the like. The computer system 700 also optionally includes a display 714. A network interface 710 is provided for communicating with other computer systems. It will be apparent to one of ordinary skill in the art that the computer system 700 may include more or less features depending on the complexity of the system needed.

According to an embodiment, one or more of the steps of the methods 400-600 and other steps described herein are implemented as software embedded on a computer readable medium, such as the memory 706 and/or 708, and executed on the computer system 700, for example, by the processor 702.

In an example, the control system 300 shown in FIG. 3A may be implemented using a set of programmed instructions that when executed by a processor causes the processor 702 to perform as described herein, including the steps described with respect to the methods 400-600 and for calculating values based on the equations described above. The instructions may be a set of executable instructions derived from one or more source code modules implemented using any number of known programming languages. Alternatively, the instructions may be implemented using hardware or firmware, or a combination thereof or in further combination with the executable software instructions described above. The instructions may be embodied upon a computer-readable medium and downloaded to the system 100 or retrieved by the system 100 into one or more local memories for execution.

One or more of the steps of the methods 400-600 and other steps described herein are embodied in a computer program, which may exist in a variety of forms both active and inactive. For example, the steps exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What is claimed is:

1. A method of controlling resource entitlement for a resource compartment, the method comprising:
    automatically determining, by a computer, a target utilization for a resource compartment for a current interval, wherein the target utilization varies based on a QoS metric measured for a previous interval and a QoS metric target;
    automatically determining a gain for a control system controlling the resource entitlement for the resource compartment, wherein the gain varies depending on a demand of the resource compartment in the previous interval and the determined target utilization; and
    adjusting a resource entitlement for the resource compartment for the current interval based on the gain and the target utilization.

2. The method of claim 1, wherein automatically determining a target utilization for the resource compartment for a current interval comprises:
    determining the QoS metric target;
    determining an error between the target and the measured QoS metric; and
    calculating the target utilization based on the error.

3. The method of claim 2, further comprising:
    determining whether the calculated target utilization is greater than an upper bound target utilization or less than a lower bound target utilization; and
        selecting a new target utilization other than the calculated target utilization to be used as the target utilization for the current interval if the calculated target utilization is greater than the upper bound target utilization or less than the lower bound target utilization, wherein the new target utilization is greater than or equal to the lower bound target utilization and less than or equal to the upper bound target utilization.

4. The method of claim 2, further comprising:
    using an integral controller to calculate the target utilization based on the error, a gain for the integral controller, and a target utilization for the previous interval.

5. The method of claim 1, wherein automatically determining a gain for the control system further comprises:
    determining whether the resource compartment is in an overload or an underload condition for the previous interval; and
    determining the gain using a first weighting factor if the resource compartment is in an overload condition for the previous interval; and
    determining the gain using a second weighting factor different from the first weighting factor if the resource compartment is in an underload condition for the previous interval.

6. The method of claim 5, wherein determining whether the resource compartment is in an overload or an underload condition for the previous interval further comprises:
    determining resource consumption for the resource compartment for the previous interval;
    determining the resource entitlement for the previous interval; and
    determining whether the resource compartment is in the overload or the underload condition for the previous interval based on the resource consumption and the entitlement.

7. The method of claim 1, further comprising:
    determining the resource entitlement for the resource compartment for the current interval based on a resource entitlement for the previous interval, an error between a measured resource utilization for the previous interval and a target utilization for the previous interval, and the determined gain.

8. The method of claim 1, wherein the QoS metric measured for the previous interval comprises a first QoS metric and a second QoS metric; and
    wherein automatically determining a target utilization for a resource compartment for a current interval, wherein the target utilization varies based on a QoS metric measured for a previous interval further comprises:
        determining the target utilization based on the first QoS metric and the second QoS metric such that a QoS metric target for each of the first QoS metric and the second QoS metric are achieved for the current interval.

9. The method of claim 8, wherein the first QoS metric and the second QoS metric comprise throughput and response time.

10. The method of claim 9, wherein determining the target utilization further comprises:
    calculating a first target utilization for the first QoS metric;
    calculating a second target utilization for the second QoS metric; and
    selecting a target utilization that is a minimum of the first and second target utilizations to be the determined target utilization.

11. The method of claim 9, further comprising:
    calculating a first target utilization for the first QoS metric;
    calculating a second target utilization for the second QoS metric;
    determining whether the second calculated target utilization is greater than an upper bound target utilization or less than a lower bound target utilization, wherein the upper bound is equal to the first target utilization; and
    selecting a new target utilization other than the second calculated target utilization to be used as the target utilization for the current interval if the second calculated target utilization is greater than the upper bound target utilization or less than the lower bound target utilization.

12. A control system implemented on a computer including nested control loops for controlling resource entitlement for a resource compartment in a resource-on-demand system, the control system comprising:
    an inner loop of the nested control loops, the inner loop including an adaptive feedback control system including an adaptive controller operable to automatically determine a gain for the control system, wherein the gain varies depending on a demand of the resource compartment in a previous interval and a target utilization, wherein the adaptive controller is operable to determine a resource entitlement for the resource compartment for a current interval based on the gain and the target utilization; and an outer loop of the nested control loops, the outer loop including a feedback control system operable to automatically determine the target utilization for the current interval, wherein the target utilization varies based on at least one QoS metric measured for the previous interval and a QoS metric target.

13. The control system of claim 12, further comprising:
a resource scheduler operable to receive the resource entitlement for the resource compartment determined by the adaptive controller and is operable to schedule the resource entitlement for the current interval for the resource compartment, such that the resource compartment is allocated an entitled amount of a resource for the current interval.

14. The control system of claim 12, wherein the resource comprises one of CPU cycles, network bandwidth, disk I/O bandwidth, and storage space.

15. The control system of claim 12, wherein the at least one QoS metric comprises at least one of response time and throughput.

16. The control system of claim 12, wherein the outer loop further comprises a first controller operable to calculate a first target utilization based on a first QoS metric and second controller operable to calculate a second target utilization based on a second QoS metric, and the target utilization for the current interval is determined using the first and second target utilizations.

17. The control system of claim 16, wherein the target utilization for the current interval is selected from one of the first and second target utilizations.

18. The control system of claim 16, wherein the first target utilization is used as an upper bound for the target utilization for the current interval.

19. A computer readable storage medium upon which is embedded programmed instructions which when executed by a processor will cause the processor to perform a method for controlling resource entitlement for a resource compartment, the method comprising:

automatically determining a target utilization for a resource compartment for a current interval, wherein the target utilization varies based on a QoS metric measured for a previous interval and a QoS metric target;

automatically determining a gain for a control system controlling the resource entitlement for the resource compartment, wherein the gain varies depending on a demand of the resource compartment in the previous interval and the determined target utilization; and adjusting a resource entitlement for the resource compartment for the current interval based on the gain and the target utilization.

20. The computer readable medium of claim 19, wherein determining a target utilization for the resource compartment for a current interval comprises:

determining the QoS metric target;
determining an error between the target and the measured QoS metric for the previous interval; and
calculating the target utilization based on the error.

* * * * *